Oct. 12, 1926.  
J. J. McELROY  
AIR SPRING  
Filed Dec. 19, 1921
1,602,536
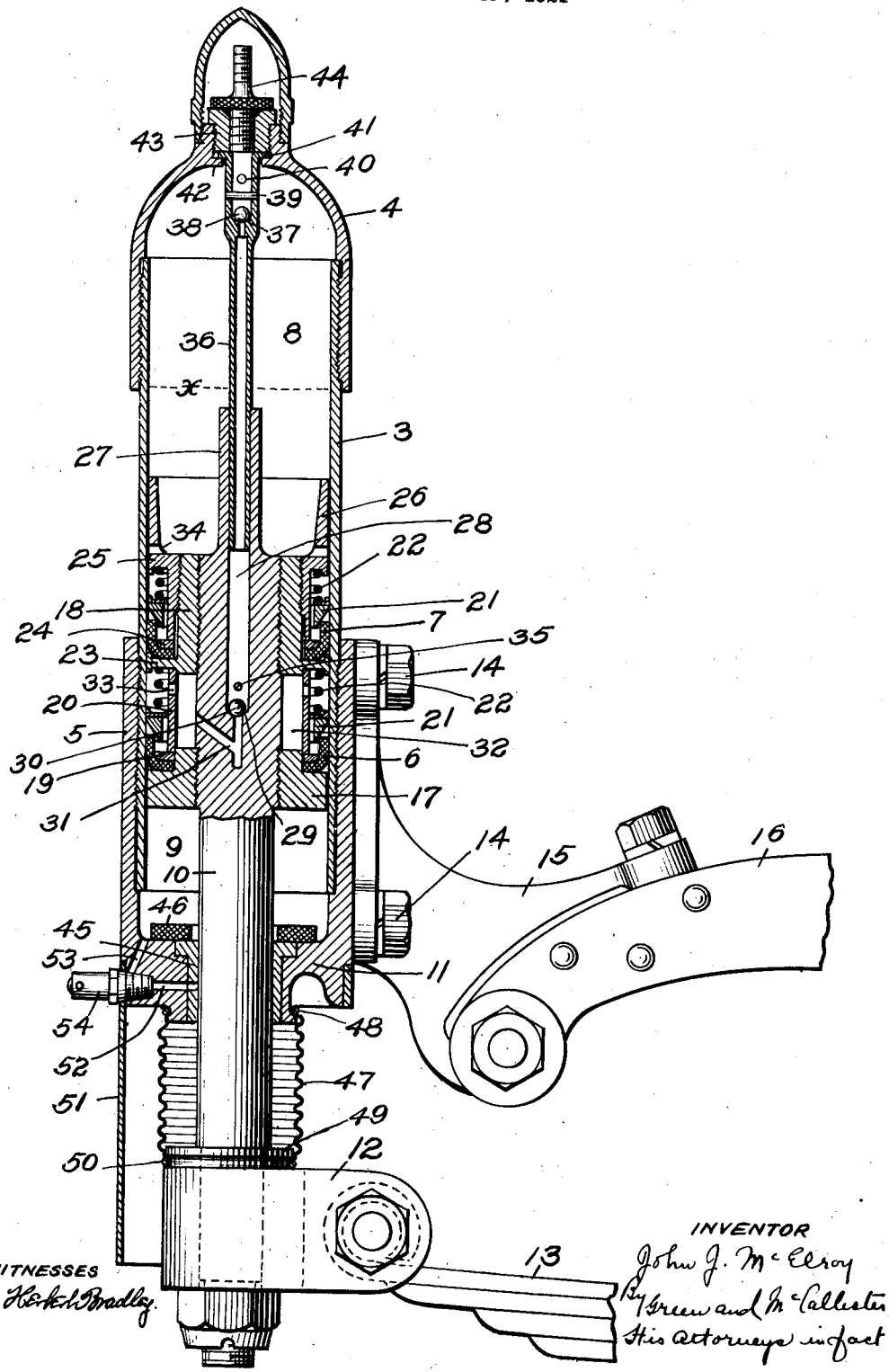
WITNESSES  
J. Herbert Bradley
INVENTOR  
John J. McElroy  
By Green and McAllister  
His Attorneys in fact Patented Oct. 12, 1926.

1,602,536

UNITED STATES PATENT OFFICE.

JOHN J. McELROY, OF NEW HAVEN, CONNECTICUT, ASSIGNOR TO THE WESTINGHOUSE AIR SPRING COMPANY, OF NEW HAVEN, CONNECTICUT, A CORPORATION OF PENNSYLVANIA.

AIR SPRING.

Application filed December 19, 1921. Serial No. 523,398.

This invention relates to hydro-pneumatic devices of the type set forth by Letters Patent No. 1,036,043 issued to George Westinghouse on August 20, 1912.

In the present application as in said patent, the invention is embodied in a fluid compression device adapted for use as a compression spring broadly applicable in any relation where two bodies are so associated that resilient support of one is desirable, and a general object in view in this application as in said patent is to embody the principle of resilient support by an elastic compression medium such as air in a commercially practical self-contained airtight compression device adapted to serve all of the purposes and functions of a spring.

This invention also resembles the device of said patent in so far as a fluid tight joint between the sliding surfaces of the device is maintained by means of a liquid seal.

This invention also resembles the device of Patent No. 1,179,253 issued to George Westinghouse on April 11, 1916, in that successive annular packings for the sliding joint between the plunger and the cylinder are utilized and a pump having its intake connected up to the space between said packings is utilized for withdrawing sealing liquid from between the packings and for returning it to the load supporting cushion chamber.

This invention also resembles that of Patent No. 1,146,335 issuede to Richard Liebau on June 13, 1915, in that the pump for transferring liquid from the sliding joint to the load supporting cushion chamber has one of its elements, carried by one of the relatively movable members forming a part of the cushion chamber, while the other pump member is mechanically connected to the other relatively movable member forming the cushion chamber.

According to the present invention, which is, broadly applicable for use as a spring for motor vehicles (which hereinafter without any idea of limiting the invention will be referred to as an air spring) a pump of such character is utilized that under no conditions of operation will air be forced thereby into the variable volume cushion chamber of the air spring.

A further object of this invention is to provide an effective rebound check so that extreme extension movements of the air spring will be cushioned without shock or jar.

A still further object is to provide a relatively cheap, simple air spring of the direct acting type as distinguished from the devices of those patents in which the sealing liquid is caused to surge through a constriction in the plunger head during the extension and compression movements of the air spring.

A still further object is to provide a simple, rugged air spring construction in which a flexible boot may be readily utilized for protecting the exposed sliding surfaces from dust, etc.

The single figure of the drawings is a sectional elevation of a front air spring embodying this invention.

The device consists of a suitable length of tubing 3, to the upper end of which a dome shaped head 4 is threaded and to the lower end of which a cup-shaped casting 5 is threaded.

A piston or plunger carrying two annular cup-shaped packings 6 and 7 is arranged to slide within tubing 3 and divides the interior of the air spring into a variable volume load supporting cushion chamber 8 and a rebound or recoil check chamber 9.

A piston rod 10, carries the piston or plunger and projects through bottom 11 of the air spring and by means of a suitable connector 12 is connected to the front end of one of the front leaf springs 13 of the vehicle (in the case of front springs) while cup-shaped member 5 which forms the lower portion of the air spring is formed for suitable connection by means of bolts 14 to a bracket 15 which, in turn is formed for attachment to one front horn 16 of the vehicle frame.

The piston of the air spring preferably consists of a lower annular nut or base 17 threaded onto the piston rod and an upper annular nut or follower 18 threaded onto the upper end of the piston rod. These two nuts 17 and 18 form supports for the cup packings 6 and 7 and their outer peripheries are preferably finished so as to form bearing surfaces adapted to slide on the inner surface of cylinder 3. Packing 6 is held in place on nut 17 by means of an annular washer 19 and a tubular retainer 20, which is held in place by cylindrical nut 18, The free edge of each of the cupped packings is pressed against the inner wall of cylinder 3 by means of a cone expander 21 and a helical spring 22. Cupped packing 7 is held in place on annular flange 23 of annular nut 18 by means of an annular washer 24 and nut 25. Nut 25 is threaded onto the threaded external surface of annular nut 18 and is formed with a relatively long cylindrical bearing surface 26.

Piston rod 10 is provided with an upper extension 27 and this, as well as a portion of the rod below the same is drilled to form a pump barrel 28. A valve seat 29 for a ball valve 30 is formed in the bottom of the pump barrel and a duct or channel 31 connects the pump barrel with the space 32 inside of tubular packing retainer 20. This retainer is provided with a number of oil holes 33 near its upper edge and the space between this tubular retainer and the wall of cylinder 3 below holes 33 serves as an oil retaining chamber for maintaining a constant oil seal for the free edge of cup packing 6.

Oil ducts 34 extend through flange 26 of the piston. A pin 35 extends through the piston rod above ball valve 30 and retains the valve at the lower end of the pump barrel.

A tubular piston 36 secured to head 4 of the device is reciprocable within the pump barrel and this piston at its upper end is slightly enlarged to form a valve housing having a valve seat 37 for a ball valve 38 which is retained in place by means of a pin 39.

The pump piston above ball valve 38 is provided with a hole 40 through which the oil forced up past the valve 38 will flow into the cushion chamber 8 of the air spring.

The upper end of the tubular piston is provided with an annular flange 41 which is held in contact with an annular lip surrounding the central opening in the dome shaped top member 4. The upper end of the piston 36 has a loose fit with the inner periphery of lip 42 so that the piston 36 is self-centering with relation to pump barrel 28. The piston 36 is securely held in place longitudinally by means of threaded nut 43 which bears on the top of flange 41. Nut 43 is drilled and tapped to receive an ordinary tire valve 44.

A flanged bushing 45 formed from suitable bearing metal is placed within the central opening of bottom member 11 and serves as a bearing for the piston rod 10.

An annular buffer 46 formed of some suitable soft material loosely surrounds piston rod 10 and rests on the bottom of recoil chamber 9. A flexible boot 47 at its upper end is secured to a lower annular projection on the bottom member of the spring by means of a retaining ring or wire 48 while the lower end of the boot is secured to an upwardly extending annular flange 49 of connector 12 by means of a retaining ring or wire 50.

A dust guard 51 preferably formed of sheet metal is connected to the lower end of bottom member 5 and near its top is pierced to receive an oiling plug 54 which is threaded within a tapped hole near the bottom of the device. An oil duct 52 leads from this oiling plug through bushing 45 to the piston rod and a drain duct 53 leads from the bottom of recoil chamber 9 and is normally closed by oiling plug 54.

Normally the cushion chamber 8 will be filled with suitable oil to the level marked "X" and during operation of the air spring oil which leaks past packing 7 will collect within the annular chamber above packing 6. The surplus which flows through openings 33 in the tubular packing retainer 20 will flow into annular chamber 32 and from there will pass to the inlet duct 31 of the oil pump. Upon extension and compression movements of the air spring, this oil will be pumped back to the cushion chamber 8 of the device.

It will be understood that the device will be initially charged with the required amount of air under pressure through valve 44. The air pumped through valve 44 will flow into the cushion chamber 8 of the device through opening 40 in the pump piston above the outlet valve 38.

The pump, on account of its tubular piston 36 with its outlet valve located at its top is of such a low volumetric efficiency that no air will be forced into the cushion chamber 8 during any operating conditions that the air spring may be subjected to.

It will be understood that if desired instead of having chamber 9 below the piston substantially air-tight for the purpose of forming a recoil check, a conical shaped helical spring having its base resting on the bottom of the cylinder and its apex terminating short of the piston with the piston in mid position, may be utilized as a recoil check.

Oil ducts 34 render any oil in cushion chamber 8 available as sealing liquid for high pressure packing 7.

Having thus described my invention, what I claim is:—

1. In a vehicle air spring, a cylinder, a piston dividing the cylinder into a cushion chamber on one side and a rebound check chamber on the other side, a rod extending from said piston through the bottom of said cylinder, spaced packings for the joint between said piston and cylinder, a liquid collecting chamber in the space between said packings, a pump barrel carried by said rod and a hollow plunger connected to said cylinder and having a discharge valve located adjacent its end farthest removed from said piston.

2. In a vehicle air spring, relatively movable members forming two closed chambers of variable volumetric capacity and the pressures in which act in opposition, spaced packings for the sliding joint between said members and a pump connected to and positively operated by the movement of said members for transferring liquid internally from the space between said packings and being so constructed as to be incapable of pumping air during the normal operation of said spring.

3. In a vehicle air spring, a cylinder provided with top and bottom members, a piston, a rod extending from said piston through the bottom of said cylinder and with said piston dividing the cylinder into an airtight cushion chamber and a relatively tight rebound check chamber, successive annular packings for said piston and a pump having one element carried by said cylinder and the other element carried by said piston and having its inlet in the space between said packings and its outlet passing through said piston.

4. In a vehicle air spring, a cylinder, top and bottom members for said cylinder, a piston slidable within said cylinder, a rod extending from said piston through the bottom member and with said piston dividing said cylinder into an upper cushion chamber and a lower rebound check chamber, successive annular packings carried by said piston between said chambers, a pump barrel carried by said piston, a hollow pump plunger carried by the top member, a valved inlet passage terminating in the space between said packings to said pump barrel, a pump outlet valve at the top of said plunger, an opening in said plunger above said outlet valve and a valved air inlet communicating with the top of said plunger.

5. In a vehicle air spring, relatively movable members forming an air-tight cushion chamber and a relatively tight rebound check chamber, said chambers being of variable volumetric capacity and the pressure in which act in opposition, spaced packings for the sliding joint between the said members and enclosing a liquid collecting chamber on the low pressure side of said sliding joint, and a pump operated by the movement of said members for transferring liquid internally from the low pressure side of said sliding joint to the high pressure side thereof.

In testimony whereof, I have hereunto subscribed my name this 5th day of December, 1921.

JOHN J. McELROY.